United States Patent [19]
Helms

[11] Patent Number: 5,806,249
[45] Date of Patent: Sep. 15, 1998

[54] PLASTIC TIMBER LANDSCAPING SYSTEM

[76] Inventor: Joe L. Helms, 8127 Henry Harris Rd., Fort Mill, S.C. 29715

[21] Appl. No.: 671,002

[22] Filed: Jun. 28, 1996

[51] Int. Cl.[6] .............................. A01G 1/08; E02D 29/02
[52] U.S. Cl. ................................ 52/102; 47/33; 52/98; 52/233; 52/313; 52/DIG. 8; 405/284
[58] Field of Search ......................... 47/33; 52/98, 100, 52/102, 233, 309.1, 313, DIG. 8; 405/284, 286

[56] References Cited

U.S. PATENT DOCUMENTS

| | | | |
|---|---|---|---|
| 3,094,197 | 6/1963 | Attwood | 52/100 |
| 4,275,535 | 6/1981 | Stalzer | 52/100 |
| 4,305,238 | 12/1981 | Harward et al. | 52/233 |
| 4,601,140 | 7/1986 | Russo | 52/102 |
| 4,834,585 | 5/1989 | Hasenwinkle et al. | 52/233 X |
| 4,897,955 | 2/1990 | Winsor | 47/33 |
| 4,910,910 | 3/1990 | Jones | 47/33 |
| 5,168,678 | 12/1992 | Scott, Jr. et al. | 52/102 |
| 5,542,787 | 8/1996 | Charlanow | 52/233 X |

FOREIGN PATENT DOCUMENTS

| | | | |
|---|---|---|---|
| 288192 | 10/1988 | European Pat. Off. | 47/33 |
| 2118243 | 10/1972 | Germany | 47/33 |

*Primary Examiner*—Carl D. Friedman
*Assistant Examiner*—Kevin D. Wilkens

[57] ABSTRACT

A new Plastic Timber Landscaping System for providing an efficient landscaping tool which has the appearance of natural wood but does not rot or discolor from the elements, and of which is constructed from a staggered formation increasing strength and stability of the structure. The inventive device includes a plurality of elongated hollow rectangular members constructed from plastic including a plurality of knockout passages near the ends of said elongated hollow rectangular members, where the knockout passages align to corresponding knockout passages of other elongated hollow rectangular members where a joiner pipe projects through the corresponding knockout passages providing a strong, staggered, orthogonal connection of at least two elongated hollow rectangular members, and where the elongated hollow rectangular members include arcuate wood grain sides and a planar wood grain top simulating the appearance of natural wood.

6 Claims, 3 Drawing Sheets

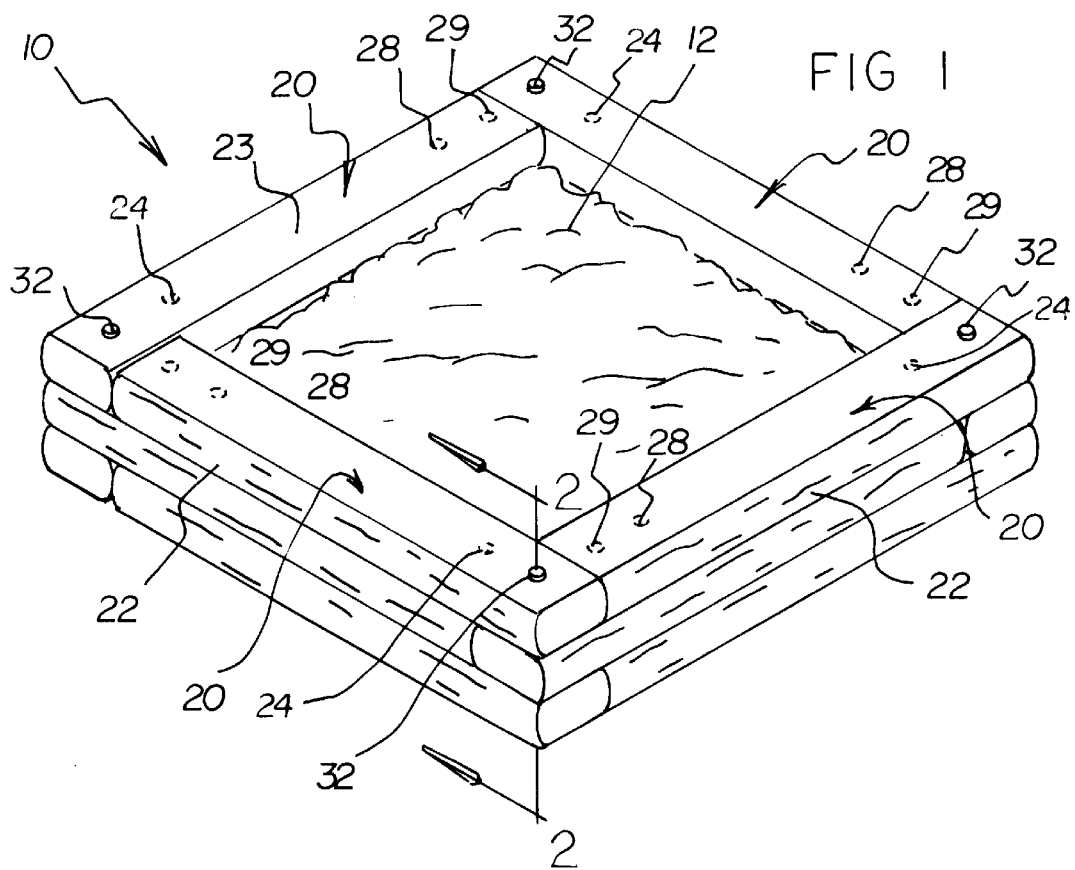
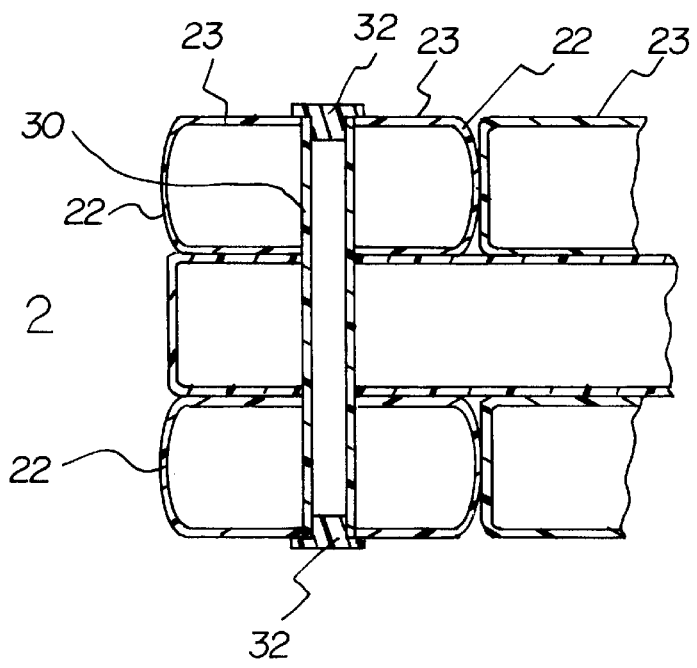

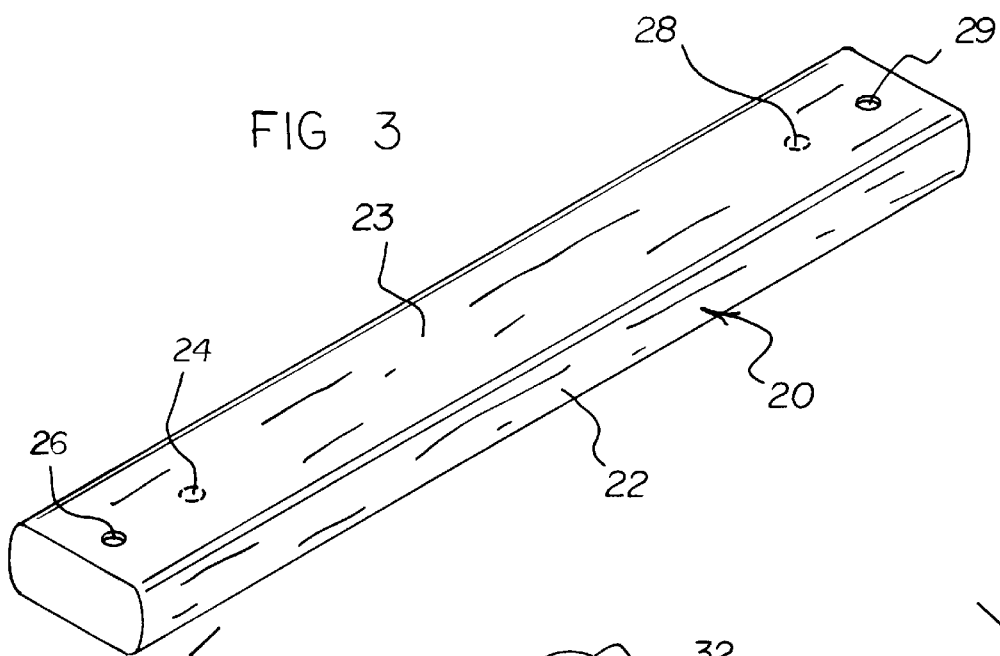
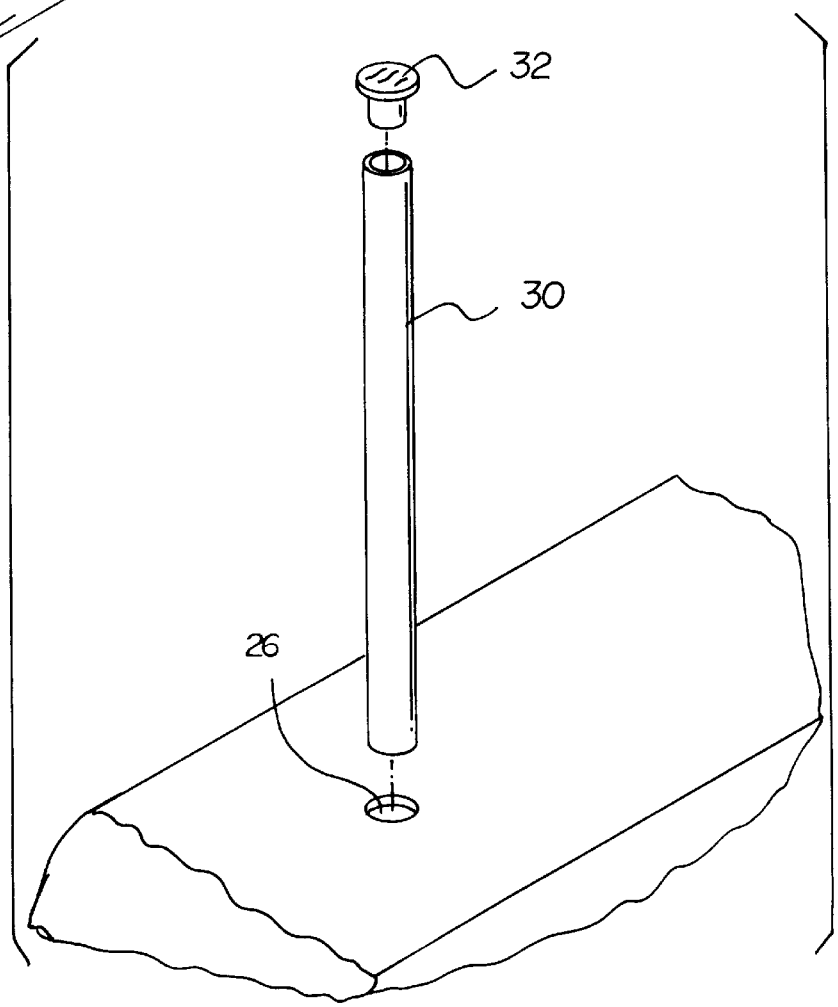

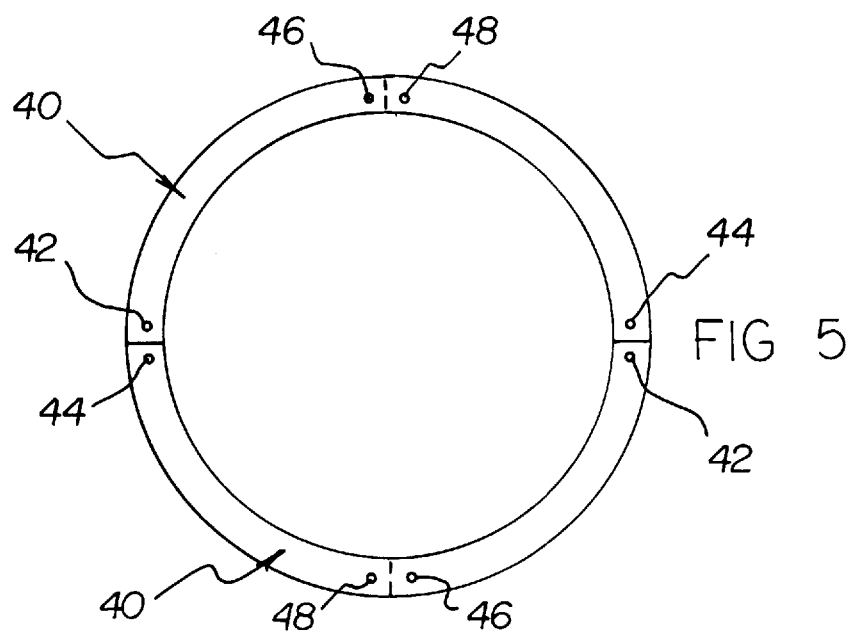
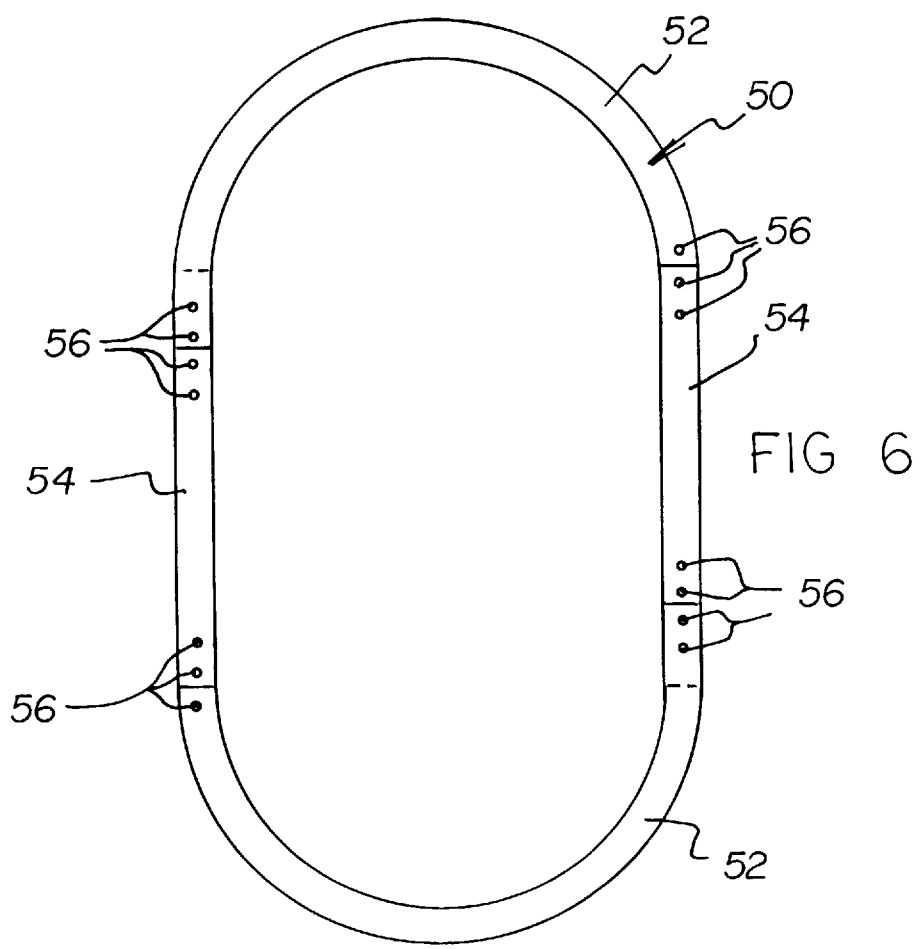

PLASTIC TIMBER LANDSCAPING SYSTEM

BACKGROUND OF THE INVENTION

1. Field of the Invention

The present invention relates to Landscaping Devices and more particularly pertains to a new Plastic Timber Landscaping System for providing an efficient landscaping tool which has the appearance of natural wood but does not rot or discolor from the elements, and of which is constructed from a staggered formation increasing strength and stability of the structure.

2. Description of the Prior Art

The use of Landscaping Devices is known in the prior art. More specifically, Landscaping Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Landscaping Devices include U.S. Pat. No. 4,976,063; U.S. Pat. No. 4,543,745; U.S. Pat. No. Design 276,494; U.S. Pat. No. 4,566,219; U.S. Pat. No. 5,442,877 and U.S. Pat. No. Design 344,810.

While these devices fulfill their respective, particular objectives and requirements, the aforementioned patents do not disclose a new Plastic Timber Landscaping System. The inventive device includes a plurality of elongated hollow rectangular members constructed from plastic including a plurality of knockout passages near the ends of said elongated hollow rectangular members, where the knockout passages align to corresponding knockout passages of other elongated hollow rectangular members where a joiner pipe projects through the corresponding knockout passages providing a strong, staggered, orthogonal connection of at least two elongated hollow rectangular members, and where the elongated hollow rectangular members include arcuate wood grain sides and a planar wood grain top simulating the appearance of natural wood.

In these respects, the Plastic Timber Landscaping System according to the present invention substantially departs from the conventional concepts and designs of the prior art, and in so doing provides an apparatus primarily developed for the purpose of providing an efficient landscaping tool which has the appearance of natural wood but does not rot or discolor from the elements, and of which is constructed from a staggered formation increasing strength and stability of the structure.

SUMMARY OF THE INVENTION

In view of the foregoing disadvantages inherent in the known types of Landscaping Devices now present in the prior art, the present invention provides a new Plastic Timber Landscaping System construction wherein the same can be utilized for providing an efficient landscaping tool which has the appearance of natural wood but does not rot or discolor from the elements, and of which is constructed from a staggered formation increasing strength and stability of the structure.

The general purpose of the present invention, which will be described subsequently in greater detail, is to provide a new Plastic Timber Landscaping System apparatus and method which has many of the advantages of the Landscaping Devices mentioned heretofore and many novel features that result in a new Plastic Timber Landscaping System which is not anticipated, rendered obvious, suggested, or even implied by any of the prior art Landscaping Devices, either alone or in any combination thereof.

To attain this, the present invention generally comprises a plurality of elongated hollow rectangular members constructed from plastic including a plurality of knockout passages near the ends of said elongated hollow rectangular members, where the knockout passages align to corresponding knockout passages of other elongated hollow rectangular members where a joiner pipe projects through the corresponding knockout passages providing a strong, staggered, orthogonal connection of at least two elongated hollow rectangular members, and where the elongated hollow rectangular members include arcuate wood grain sides and a planar wood grain top simulating the appearance of natural wood.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Plastic Timber Landscaping System apparatus and method which has many of the advantages of the Landscaping Devices mentioned heretofore and many novel features that result in a new Plastic Timber Landscaping System which is not anticipated, rendered obvious, suggested, or even implied by any of the prior art Landscaping Devices, either alone or in any combination thereof.

It is another object of the present invention to provide a new Plastic Timber Landscaping System which may be easily and efficiently manufactured and marketed.

It is a further object of the present invention to provide a new Plastic Timber Landscaping System which is of a durable and reliable construction.

An even further object of the present invention is to provide a new Plastic Timber Landscaping System which is susceptible of a low cost of manufacture with regard to both materials and labor, and which accordingly is then susceptible of low prices of sale to the consuming public, thereby making such Plastic Timber Landscaping System economically available to the buying public.

Still yet another object of the present invention is to provide a new Plastic Timber Landscaping System which provides in the apparatuses and methods of the prior art some of the advantages thereof, while simultaneously overcoming some of the disadvantages normally associated therewith.

Still another object of the present invention is to provide a new Plastic Timber Landscaping System for providing an efficient landscaping tool which has the appearance of natural wood but does not rot or discolor from the elements, and of which is constructed from a staggered formation increasing strength and stability of the structure.

Yet another object of the present invention is to provide a new Plastic Timber Landscaping System which includes a plurality of elongated hollow rectangular members constructed from plastic including a plurality of knockout passages near the ends of said elongated hollow rectangular members, where the knockout passages align to corresponding knockout passages of other elongated hollow rectangular members where a joiner pipe projects through the corresponding knockout passages providing a strong, staggered, orthogonal connection of at least two elongated hollow rectangular members, and where the elongated hollow rectangular members include arcuate wood grain sides and a planar wood grain top simulating the appearance of natural wood.

Still yet another object of the present invention is to provide a new Plastic Timber Landscaping System that is lightweight and made from a simple construction.

Even still another object of the present invention is to provide a new Plastic Timber Landscaping System that resembles logs, railroad ties and other various wood products.

Still another object of the present invention is to provide a new Plastic Timber Landscaping System that retains dirt within a completed structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side perspective view of a new Plastic Timber Landscaping System retaining dirt within according to the present invention.

FIG. 2 is a cross sectional view taken along line 2—2 of FIG. 1 disclosing the joiner pipe projecting through the corresponding knockout passages of the elongated hollow rectangular members.

FIG. 3 is a side perspective view of an elongated hollow rectangular member including a plurality of knockout passages.

FIG. 4 is an exploded isometric view of the joiner pipe, finishing cap and the elongated hollow rectangular member in cooperation.

FIG. 5 is an alternative embodiment of the present invention comprising a plurality of hollow semi-circular members.

FIG. 6 is still another alternative embodiment of the present invention disclosing a hollow oblong structure.

DESCRIPTION OF THE PREFERRED EMBODIMENT

With reference now to the drawings, and in particular to FIGS. 1 through 6 thereof, a new Plastic Timber Landscaping System embodying the principles and concepts of the present invention and generally designated by the reference numeral 10 will be described.

More specifically, it will be noted that the Plastic Timber Landscaping System 10 comprises at least one elongated hollow rectangular member 20, and at least one joiner pipe 30 removably projecting through an end of the elongated hollow rectangular member 20.

As best illustrated in FIGS. 1 through 4, it can be shown that the each elongated hollow rectangular member 20 includes a planar wood grain top 23. At least one arcuate wood grain side 22 is adjacent to the planar wood grain top 23. A first knockout passage 24 is near one end of the elongated hollow rectangular member 20 projecting into the planar wood grain top 23 through the bottom surface. A second knockout passage 26 is near the first knockout passage 24 spaced approximately the width of the elongated hollow rectangular member 20, and projecting into the planar wood grain top 23 through the bottom surface. A third knockout passage 28 is near the end opposite the first and second knockout passages 24 and 26 the same distance away from the end as the first knockout passage 24, and projecting into the planar wood grain top 23 into the bottom surface. A fourth knockout passage 29 is near the third knockout passage 28 spaced approximately the same distance as the second knockout passage 26 from the first knockout passage 24, and projecting into the planar wood grain top 23 into the bottom surface. A plurality of the elongated hollow rectangular members 20 are preferably staggered orthogonally to one another forming a hollow square structure which retains dirt 12 as shown in FIG. 1 of the drawings. The elongated hollow rectangular members 20 are secured to one another by a plurality of joiner pipes 30 projecting through the corresponding knockout members of each elongated hollow rectangular member 20. The joiner pipes 30 include a pair of finishing caps 32 removably secured at each end which prevent the joiner pipes 30 from being removed from the knockout passages and produce a finished appearance to the present invention as shown in FIG. 1 of the drawings. The finishing cap 32 is constructed so as to resemble the planar wood grain top 23.

In an alternative embodiment as shown in FIG. 5 of the drawings, at least one hollow semi-circular member 40 is formed to the appearance of natural wood. The hollow semi-circular member 40 includes a first end knockout passage 42 near one end. A second end knockout passage 44 is positioned near the end opposite of the first end knockout passage 42. A first central knockout passage 46 is positioned near one side of the center point on the hollow semi-circular member 40. A second central knockout passage 48 is positioned near the center point on the hollow semi-circular member 40 opposite of the first central knockout passage 46. A joiner pipe 30 projects through a plurality of corresponding knockout passages of the hollow semi-circular members 40 forming a hollow cylindrical structure. The joiner pipes 30 include a pair of finishing caps 32 removably secured at each end which prevent the joiner pipes 30 from being removed from the knockout passages, where the finishing caps 32 have a wood grain appearance providing a finished appearance to the present invention.

In another alternative embodiment of the present invention as shown in FIG. 6 of the drawings, at least one semi-circular member 52 has one end projecting a finite distance along the tangential path including a plurality of aligning knockout passages 56 near the ends. At least one straight member 54 includes a plurality of aligning knockout passages 56 which correspond to the aligning knockout passages 56 of the semi-circular member 52. A joiner pipe 30 projects through the corresponding aligning knockout passages 56 forming a hollow oblong structure 50 which retains dirt 12. The joiner pipes 30 include a pair of finishing caps 32 removably secured at each end which prevent the joiner pipes 30 from being removed from the aligning knockout passages, where the finishing caps 32 have a wood grain appearance providing a finished appearance to the present invention.

In use, the user positions four elongated hollow rectangular members 20 end to end into a shape of a square as best shown by the bottom layer of FIG. 1 of the drawings. The user then positions another four elongated hollow rectangular members 20 on top of the previous layer, where each elongated hollow rectangular member 20 of the top layer overlap and are orthogonal to the end of one elongated hollow rectangular member 20 of the bottom layer, and so forth. The user then projects a joiner pipe 30 though each corresponding knockout passage of the elongated hollow rectangular members 20, thereby securing the bottom and top layers forming a strengthened and stable structure which retains dirt 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plastic timber landscaping system comprising:

at least one elongated hollow rectangular member having a length and width, said rectangular member comprising spaced planar top and bottom panels and spaced side panels extending between said top and bottom panels, said side panels having an arcuate shape such that said side panels are outwardly bowed from between said top and bottom panels, said rectangular member including a first knockout passage located near one end of said rectangular member and extending through the top and bottom panels, a second knockout passage extending through the top and bottom panels and being spaced from the first knockout passage toward the other end of said rectangular member;

a third knockout passage near the end of said rectangular member opposite the end having the first and second knockout passages, said third knockout passage being spaced from the end of the rectangular member substantially the same distance as the first knockout passage is spaced from said one end of the rectangular member, said third knockout passage extending through the top and bottom panels; and a fourth knockout passage extending through the top and bottom panels and being spaced from the third knockout passage toward said one end of said rectangular member;

wherein each said knockout passage is bounded by a pair of removable knockout tabs, one said knockout tab being located in said top panel and the other said knockout tab being located in said bottom panel such that said knockout passage is closed by said tabs until said tabs are removed from said top and bottom panels; and at least one joiner pipe for removably inserting through a knockout passage in the elongated hollow rectangular member, wherein the rectangular member is removably securable to another rectangular member by inserting said joiner pipe through aligned knockout passages of adjacent rectangular members, wherein the joiner pipe includes a pair of finishing caps removably secured at each end of said joiner pipe, each said finishing cap having an enlarged portion for preventing the joiner pipe from being removed from the knockout passage of a rectangular member when said cap is mounted on said joiner pipe.

2. The plastic timber landscaping system of claim 1 wherein said second knockout passage is spaced from said first knockout passage a distance substantially equal to the width of said rectangular member; and wherein said fourth knockout passage is spaced from said third knockout passage a distance substantially equal to the width of said rectangular member.

3. The plastic timber landscaping system of claim 1 wherein a plurality of the elongated hollow rectangular members are stacked in an alternating pattern to form a hollow square structure for holding dirt therein.

4. The plastic timber landscaping system of claim 1 wherein each finishing cap is formed with a wood grain pattern.

5. A plastic timber landscaping system comprising at least one hollow curved member having a width and an arcuate length, said curved member comprising spaced planar top and bottom panels and spaced side panels extending between said top and bottom panels, said top and bottom panels having a curved shape along said arcuate length, said side panels having an arcuate shape such that said side panels are outwardly bowed from between said top and bottom panels, the width of said top and bottom said curved member including a first knockout passage located near one end of said curved member and extending through the top and bottom panels, a second knockout passage extending through the top and bottom panels and being spaced from the first knockout passage toward the other end of said curved member;

a third knockout passage near the end of said curved member opposite the end having the first and second knockout passages, said third knockout passage being spaced from the end of the curved member substantially the same distance as the first knockout passage is spaced from said one end of the curved member, said third knockout passage extending through the top and bottom panels of said curved member; and a fourth knockout passage extending through the top and bottom panels and being spaced from the third knockout passage toward said one end of said curved member;

wherein each said knockout passage is bounded by a pair of removable knockout tabs, one said knockout tab being located in said top panel and the other said knockout tab being located in said bottom panel such that said knockout passage is closed by said tabs until said tabs are removed from said top and bottom panels; and at least one joiner pipe for removably inserting through a knockout passage in the curved member, wherein the curved member is removably securable to another curved member by inserting said joiner pipe through aligned knockout passages of adjacent members, wherein the joiner pipe includes a pair of finishing caps removably secured at each end of said joiner pipe, each said finishing cap having an enlarged portion for preventing the joiner pipe from being removed from the knockout passage of a curved member when said cap is mounted on said joiner pipe.

6. The plastic timber landscaping system of claim 5 distance substantially equal to the half of the width dimension of said curved member;

wherein said second knockout passage is spaced from said first knockout passage a distance substantially equal to the width of said curved member; and wherein said fourth knockout passage is spaced from said third knockout passage a distance substantially equal to the width of said curved member.

\* \* \* \* \*